(12) United States Patent
Bhaskaran et al.

(10) Patent No.: US 11,616,753 B2
(45) Date of Patent: *Mar. 28, 2023

(54) METHOD AND APPARATUSES FOR AVOIDING PAGING STORM DURING ARP BROADCAST FOR ETHERNET TYPE PDU

(71) Applicant: Huawei Technologies Co., Ltd., Shenzhen (CN)

(72) Inventors: Sridhar Bhaskaran, Bengaluru (IN); Marco Spini, Boulogne Billancourt (FR); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,335

(22) Filed: Jul. 30, 2021

(65) Prior Publication Data

US 2021/0359971 A1 Nov. 18, 2021

Related U.S. Application Data

(63) Continuation of application No. 16/789,697, filed on Feb. 13, 2020, now Pat. No. 11,128,596, which is a (Continued)

(30) Foreign Application Priority Data

Aug. 14, 2017 (IN) .............................. 201741028886

(51) Int. Cl.
*H04L 12/00* (2006.01)
*H04L 61/103* (2022.01)
(Continued)

(52) U.S. Cl.
CPC ........ *H04L 61/103* (2013.01); *H04L 61/5014* (2022.05); *H04W 76/12* (2018.02); *H04L 2101/622* (2022.05); *H04L 2101/659* (2022.05)

(58) Field of Classification Search
CPC ......... H04L 2101/659; H04L 2101/622; H04L 61/59; H04L 61/103; H04L 61/5014; H04L 61/58; H04W 76/12
(Continued)

(56) References Cited

U.S. PATENT DOCUMENTS

| 7,046,666 B1 * | 5/2006 | Bollay | H04L 61/00 |
| | | | 370/392 |
| 11,128,596 B2 * | 9/2021 | Bhaskaran | H04L 61/58 |

(Continued)

FOREIGN PATENT DOCUMENTS

| CN | 1682516 A | 10/2005 |
| CN | 101035012 A | 9/2007 |

(Continued)

OTHER PUBLICATIONS

S2-177079, Huawei, et al., "Solving paging storm issue on ARP broadcast in Ethernet PDU sessions (TS 23.501)," SA WG2 Meeting #123, Ljubljana, Slovenia, Oct. 23-27, 2017, 12 pages.
(Continued)

*Primary Examiner* — Frantz Coby
(74) *Attorney, Agent, or Firm* — Conley Rose, P.C.

(57) ABSTRACT

Methods and apparatuses for acquisition of an Address Resolution Protocol (ARP)/IPv6 neighbour cache at a user plane function (UPF) entity without performing deep packet inspection for every packet that traverses a network. The ARP broadcast/Internet Control Message Protocol version 6 (ICMPv6) neighbour solicitation multicast from any Ethernet client (a user equipment (UE) or clients behind the UE or clients in a data network (DN)) is responded to by the UPF entity itself, by looking up the ARP/IPv6 Neighbour cache built in the UPF entity, irrespective of whether the UPF entity acts as the core Ethernet switch or whether the core Ethernet switch is in the DN. The solution is simplified
(Continued)

to always intercept ARP at the UPF entity and respond to it based on a local ARP/IPv6 Neighbour cache.

20 Claims, 7 Drawing Sheets

Related U.S. Application Data continuation of application No. PCT/CN2018/099252, filed on Aug. 7, 2018.

(51) Int. Cl.
*H04W 76/12* (2018.01)
*H04L 61/5014* (2022.01)
*H04L 101/622* (2022.01)
*H04L 101/659* (2022.01)

(58) Field of Classification Search
USPC .......................................................... 709/245
See application file for complete search history.

(56) References Cited

U.S. PATENT DOCUMENTS

| | | | |
|---|---|---|---|
| 2003/0076837 A1* | 4/2003 | Whitehill | H04L 61/10 370/395.4 |
| 2004/0203740 A1 | 10/2004 | Won et al. | |
| 2006/0013211 A1 | 1/2006 | Deerman et al. | |
| 2007/0153738 A1 | 7/2007 | Barker, Jr. et al. | |
| 2010/0098073 A1 | 4/2010 | Tanaka et al. | |
| 2013/0297825 A1 | 11/2013 | Wang et al. | |
| 2014/0003426 A1 | 1/2014 | Sankar et al. | |
| 2015/0058463 A1 | 2/2015 | Wang et al. | |
| 2015/0124817 A1 | 5/2015 | Merchant et al. | |
| 2016/0352622 A1 | 12/2016 | Gautam et al. | |

FOREIGN PATENT DOCUMENTS

| | | |
|---|---|---|
| CN | 101262505 A | 9/2008 |
| CN | 101808107 A | 8/2010 |
| CN | 101951367 A | 1/2011 |
| CN | 102111459 A | 6/2011 |
| CN | 102572012 A | 7/2012 |
| CN | 102572013 A | 7/2012 |
| EP | 2521320 B1 | 6/2015 |
| WO | 2010094214 A1 | 8/2010 |
| WO | 2011079660 A1 | 7/2011 |
| WO | 2012006190 A1 | 1/2012 |

OTHER PUBLICATIONS

S2-172050, Nokia, "TS 23.502: P-CR for Single Registration-based Interworking from EPS to 5GS procedure," SA WG2 Meeting #120, Busan, Korea, Mar. 27-31, 2017, 5 pages.

Cisco, "Cisco Wireless LAN Controller Configuration Guide, Release 7.4," Retrieved from: http://www.cisco.com/c/en/us/td/docs/wireless/controller/7-4/configuration/guides/consolidated/b_cg74_CONSOLIDATED/b_cg74_CONSOLIDATED_chapter_01100011.html, Jul. 12, 2016, 1064 pages.

"3rd Generation Partnership Project; Technical Specification Group Services and System Aspects; Procedures for the 5G System; Stage 2 (Release 15)," 3GPP TS 23.502 V0.5 0, Jul. 2017, 148 pages.

"3rd Generation Partnership Project; Technical Specification Group Services and System Aspects; System Architecture for the 5G System; Stage 2 (Release 15)," 3GPP TS 23.501 V1.2.0, Jul. 2017, 166 pages.

Nokia, et al., "23.501 § 5.6.10 and 5.8.2: Ethernet PDU session type," S2-175208, SA WG2 Meeting #122, Jun. 26-30, 2017, Los Cabos, Mexico, 3 pages.

Nokia, et al., "Reporting of UE MAC addresses to the SMF," C4-184299, 3GPP TSG CT WG4 Meeting #85, Osaka, Japan, May 21-25, 2018, 21 pages.

"3rd Generation Partnership Project; Technical Specification Group Services and System Aspects; System Architecture for the 5G System; Stage 2 (Release 15)," 3GPP TS 23.501 V15.2.0, Jun. 2018, 218 pages.

Monnet, Q., "In-switch ARP handling with OpenState," XP055502384, Nov. 5, 2016, 6 pages.

* cited by examiner

METHOD AND APPARATUSES FOR AVOIDING PAGING STORM DURING ARP BROADCAST FOR ETHERNET TYPE PDU

CROSS-REFERENCE TO RELATED APPLICATIONS

This application is a continuation of U.S. patent application Ser. No. 16/789,697, filed on Feb. 13, 2020, which is a continuation of international Patent Application No. PCT/CN2018/099252, filed on Aug. 7, 2018, which claims priority to Indian Patent Application No. 201741028886, filed on Aug. 14, 2017. All of the aforementioned applications are hereby incorporated by reference in their entireties.

TECHNICAL FIELD

The present subject matter described herein, in general, relates to wireless communication networks and particularly, to avoiding paging storm during address resolution protocol broadcast in a communication network. More particularly, to methods and apparatuses for acquisition of Address Resolution Protocol (ARP)/Internet Protocol (IP) version 6 (IPv6) neighbour cache at the user plane function (UPF) without performing deep packet inspection for every packet traversed.

BACKGROUND

An ARP is a protocol used by the IP to map IP network addresses to the hardware addresses used by a data link protocol. The term address resolution refers to the process of finding an address of a computer in a network. The address is "resolved" using a protocol in which a piece of information is sent by a client process executing on the local computer to a server process executing on a remote computer. The information received by the server allows the server to uniquely identify the network system for which the address was required and therefore to provide the required address. The address resolution procedure is completed when the client receives a response from the server containing the required address.

In particular, ARP maps an IP address to a physical machine address (also known as a media access control (MAC) address) that is recognized in the local network. The protocol operates below the network layer as a part of the interface between the Open Systems Interconnection (OSI) network and OSI link layer. A table, commonly referred to as an ARP/IPv6 neighbour cache, is used to maintain the correlation between each MAC address and its corresponding IP address. ARP provides the protocol rules for making this correlation and providing address conversion in both directions.

Thus, ARP is used by the data link layer to provide two basic functions: 1) resolve IP version 4 (IPv4) addresses to MAC addresses, and 2) maintain a cache table of MAC to IP addresses. To resolve name to IP address, domain name system (DNS) service is used. To resolve IP address to MAC Ethernet address, ARP service is used.

For IPv6, the Neighbour Discovery protocol is employed, which works similar to the ARP, except that instead of sending the request as a broadcast to the entire local area network (LAN), it is sent to a link local multicast address.

Systems maintain this ARP look-up table where they store information about what IP addresses are associated with what MAC addresses. When trying to send a packet to an IP address, the system will first consult this table to see if it already knows the MAC address. If there is a value cached, ARP is not used. If the IP address is not found in the ARP table, the system will then send a broadcast packet to the network using the ARP protocol enquiring "who has 192.168.1.1". This is sent to a special MAC address as it is a broadcast packet, thereby, causing all machines on the network to receive it. Any machine with the requested IP address will reply with an ARP packet that says "I am 192.168.1.1", and this includes the MAC address which can receive packets for that IP.

A protocol data unit (PDU) is information delivered as a unit among peer entities of networks containing control information, address information or data. In layered systems, a PDU represents a unit of data specified in the protocol of a given layer that consists of protocol control information and user data. PDU is a significant term related to the initial four layers of the OSI model. In Layer 1, PDU is a bit, in Layer 2 it is a frame, in Layer 3 it is a packet, and in Layer 4 it is a segment. In Layer 5 and above, PDU is referred to as data. In the context of $5^{th}$ Generation (5G) networks, a PDU session refers to a session established between the 5G mobile node and the network for carrying data of type IPv4 or IPv6 or Ethernet frame or any unstructured type. Hence in 5G networks, currently the $3^{rd}$ Generation Partnership Project (3GPP) has defined three types of PDU sessions, viz., an IP PDU session type, an Ethernet PDU session type, and an unstructured PDU session type.

3GPP is discussing the introduction of Ethernet PDU type in the 5G architecture, where a user equipment (UE) can request an Ethernet PDU type to the 5G core network and the 5G core network allocates a user plane function that acts as the PDU anchor. This anchor UPF will act as the core Ethernet switch for all the UEs that are connected to the same LAN through the Ethernet PDU. If the clients connected to the Ethernet PDU in the same LAN involve clients outside the 3GPP network (i.e., the data network (DN)) then in that case, an Ethernet switch in the DN may act as the core Ethernet switch for the LAN. The UPF acts as one of the leaf switches that connects the clients in the 3GPP network in this case. The UPF will tunnel the Ethernet frames received from the Ethernet. PDU clients in the 3GPP network to this core Ethernet switch in the DN.

The UE can also act as an Ethernet bridge allowing clients behind UE to connect through the 3GPP network, with the UE acting as a local switch. Significantly, how the UE and/or the clients behind the UE (for bridge mode operation) obtain their Layer 3 (IP) address are out of scope of 3GPP.

In conventional wireless LAN (WLAN) networks, avoiding of ARP broadcast to all WLAN clients is handled by the WLAN controller by building an ARP/IPv6 neighbour cache. Here, the WLAN controller hosts the Layer 3 (L3) address management function or Dynamic Host Configuration Protocol (DHCP) server and also participates in the data plane.

It has been disclosed that wireless LAN controllers currently act as a proxy for ARP requests. Upon receiving an ARP request, the controller responds with an ARP response instead of broadcast the request to every WLAN client. This scenario has two advantages, viz., the upstream device that sends out the ARP request to the client will not know where the client is located, and power for battery-operated devices such as mobile phones and printers is preserved because they do not have to respond to every ARP request.

Reference is made to DHCP Snooping (through deep packet inspection) and building ARP/IPv6 Neighbour Cache, wherein it has been disclosed that DHCP snooping allows a catalyst switch to inspect DHCP traffic traversing a layer two segment and track which IP addresses have been assigned to hosts on which switch ports. This information can be handy for general troubleshooting, but designed specifically to aid two other features, viz., IP source guard and dynamic ARP inspection. These features help to mitigate IP address spoofing at the layer two access edge.

Notably, snooping L3 address assignment (like DHCP snooping) and replying to ARP request directly from a switch already exist in wired LANs and wireless LANs.

The communication network can be a $4^{th}$ Generation (4G) Long-Term Evolution (LTE) or a 5G network. However, what is unique to cellular 5G based Ethernet PDU sessions and the Ethernet LAN network is that a cellular network may have millions of subscribers and many of them may be in a Connection Management-idle (CM-IDLE) state at a time. Doing DHCP snooping at an anchor switch (say a UPF entity) for so many subscriber sessions through per packet inspection is computationally intensive and it hogs the computing resources of the switch from spending cycles on normal packet forwarding. Also, for the case of core Ethernet switch being in the DN and the L3 address management server (DHCP) located in the DN, the DHCP traffic for the clients in the DN will not traverse the UPF. Hence, the UPF cannot snoop the DHCP packets in such cases.

Further, the state of art technologies is yet to discuss or solve the following problem in 3GPP, wherein after the UE and/or the clients behind the UE somehow get their Layer 3 address (IP address), UEs perform an ARP request or Neighbour Discovery Protocol request to discover the Ethernet MAC address of other UE/clients in the same LAN and this ARP request/Neighbour Discovery Protocol (NDP) request is tunneled by the radio access network (RAN) to the core network user plane function (UPF) entity. Thereafter, two scenario possibilities exist.

Scenario 1: if a UPF entity acts as the Ethernet switch, it will broadcast the ARP or multicast the NDP to every UE/client in the LAN, as illustrated in FIG. 1. Since the UEs are connected to the communication network through a tunnel, such broadcast/multicast will result in separate ARP/NDP message being sent on each tunnel.

Scenario 2: If a data network (DN) behind a UPF entity acts as the Ethernet switch, the UPF entity will forward the ARP or the NDP request from the UE or the clients behind the UE to the DN, and the core Ethernet switch will then send back the ARP request on a Layer 2 (L2) broadcast address or the NDP Neighbour Solicitation request on a link local multicast address, which will result in the UPF entity sending the ARP or the Neighbour Solicitation Request to every UE in the LAN, as illustrated in FIG. 2.

This results in a massive paging storm in the network if many UEs are in the CM-IDLE state. Similar problems also occur when clients behind the data network name (DNN) also become a part of the LAN and issue ARP/NDP Neighbour Solicitation. Significantly, paging or location finding is the process by which the network initiates a query for an endpoint's location. It is implemented by sending beacons (a broadcast message) to all cells such that one of the cells could locate the user (IP address), A UE in a CM-IDLE state is registered with the network, but has no signalling connection established. Further, how the UE obtains its MAC address and upper layer address (IP) is also out of scope of 3GPP.

Thus, there is a need to build an ARP cache/IPv6 neighbour cache at the UPF entity without performing deep packet inspection for every packet traversed in order to snoop into DHCP requests, such that the ARP cache/IPv6 neighbour cache can be used for avoiding paging storm during when an ARP request or a Neighbour Solicitation Request is issued in 5G networks for the Ethernet PDUs, to do away with unnecessary occupation and wastage of network resources.

Significantly, responding to ARP from a local ARP/IPv6 neighbour cache in a switch instead of broadcasting to every node in the LAN is a well-known mechanism. Accordingly, the objective technical problem solved by the present disclosure is avoiding a paging storm during ARP broadcast/NDP multicast in 5G networks by building an ARP cache/IPv6 neighbour cache in the UPF entity itself.

The above-described need for avoiding paging storms during ARP broadcast/NDP multicast in 5G networks is merely intended to provide an overview of some of the problems of conventional systems/mechanism/techniques, and are not intended to be exhaustive. Other problems with conventional systems/mechanism/techniques and corresponding benefits of the various non-limiting embodiments described herein may become further apparent upon review of the following description.

SUMMARY

This summary is provided to introduce concepts related to methods for avoiding a paging storm during ARP broadcast/NDP multicast for Ethernet type PDU in 5G networks and the same are further described below in the detailed description. This summary is not intended to identify essential features of the claimed subject matter, nor is it intended for use in determining or limiting the scope of the claimed subject matter.

An object of the present disclosure is to build an ARP cache/IPv6 neighbour cache in a UPF entity without performing deep packet inspection for every packet traversed, such that the ARP cache/IPv6 neighbour cache can be used to avoid ARP broadcast/NDP multicast.

Another object of the present disclosure is to provide a mechanism for a session management function (SMF) entity to learn which tunnel in a UPF entity is destined towards which MAC address(es).

Another object of the present disclosure is to update the ARP/IPv6 neighbour cache present in the UPF entity.

Another object of the present disclosure is updating the ARP/IPv6 neighbour cache in a LYE entity by a DN.

Yet another object of the present disclosure is to solve the technical problems recited hereinabove by providing an anchor UPF entity that acts as a core Ethernet switch when an L3 address management function is at the SMF entity or at the DN.

Yet another object of the present disclosure is to solve the technical problems recited hereinabove by providing a DN that acts as a core Ethernet switch when an L3 address management function is at the SMF entity or at the DN.

Yet another object of the present disclosure is to provide Deep Packet Inspection (DPI) at a UPF entity acting as a core Ethernet switch.

Yet another object of the present disclosure is to provide DPI at a DN acting as a core Ethernet switch.

Yet another object of the present disclosure is to provide a Gratuitous Attribute Registration Protocol (GARP) or an Internet Control Message Protocol version 6 (ICMPv6) Neighbour Advertisement from the UE to update the Ethernet switch ARP cache/IPv6 neighbour cache.

Yet another object of the present disclosure is to avoid paging storm during an ARP broadcast/NDP multicast for Ethernet type PDU.

In accordance with the first aspect of the present disclosure, there is provided a method of acquiring layer-2 (L2) addresses seen in a tunnel for an end user device at a user plane function (UPF) entity. The method comprises: receiving, by the UPF entity, a request from a session management function (SMF) entity for notifying any source L2 address detected on said tunnel by the UPF entity; detecting, by the UPF entity, an L2 packet with a new source L2 address on said tunnel; and sending, by the UPF entity, the new source L2 address detected on said tunnel to the SMF entity. The tunnel between the UPF entity and the network terminating the end user device is set up by a user plane setup message initiated by a session management function (SMF) entity towards the UPF entity and associated with Ethernet type protocol data unit (PDU) sessions. Further, the tunnel setup at the UPF entity is towards an access network (AN) or a data network (DN).

In one implementation of the first aspect, the present disclosure provides a method for the SMF entity to learn which tunnel in the UPF entity is destined towards which MAC address(es).

In accordance with the second aspect of the present disclosure, there is provided a method for updating an address resolution protocol (ARP) cache/IPv6 neighbour cache in a user plane function (UPF) entity by a session management function (SMF) entity. The method comprises: sending, by the SMF entity, a first request message to the UPF entity to update the ARP cache/IPv6 neighbour cache, wherein the first request message comprises an update ARP/IPv6 neighbour cache message, an L3 address, and an L2 address map; updating, by the UPF entity, the ARP cache/IPv6 neighbour cache with the L2 address map; and sending, by the UPF entity, a first response update message after updating the ARP cache/IPv6 neighbour cache to the SMF entity.

In one implementation of the second aspect, the present disclosure provides a method of updating the ARP cache/IPv6 neighbour cache built in a UPF entity. The SMF entity issues an N4 UPF Configuration Update Request to the UPF entity and carries the update ARP/IPv6 neighbour cache command along with the L3 address to L2 address map. The UPF entity updates the ARP/IPv6 neighbour cache with the provided map and sends a UPF Configuration Update Response.

In accordance with the third aspect of the present disclosure, there is provided a method for updating an ARP/IPv6 neighbour cache in a user plane function (UPF) entity by an L3 address management function of a data network (DN). The method comprises: sending, by the DIN, a first update message to a network element function (NEF) entity, wherein said first update message comprises an L2 address and an L3 address map; determining, by the NEF entity, a local configuration that indicates which session management function is controlling the UPF entity; and sending, by the NEF entity the first update message to at least one session management function.

In one implementation of the third aspect, the present disclosure provides a method for updating the ARP/IPv6 neighbour cache built in the UPF entity by the DN. When the L3 address management function is at the DN, this method is employed by the DN to inform the SMF entity about the L2 address to L3 address map such that SMF entity can update the ARP/IPv6 neighbour cache in the UPF entity.

In accordance with the fourth aspect of the present disclosure, there is provided a method for performing L3 address management function in a session management function (SMF) entity to update an ARP/IPv6 neighbour cache in a user plane function (UPF) entity, wherein said UPF entity is a core Ethernet switch. The method comprises: receiving, by the UPF entity, a first request message comprising a first request message over layer-2 (L2), said message comprising source media access control of the end user device, from an end user device; forwarding, by the UPF entity, the first request message to the SMF entity; sending, by the SMF entity, a first response message to the UPF entity; forwarding, by the UPF entity, the first response message to the end user device; sending, by the SMF entity, a first request update message to the UPF entity to update the ARP/IPv6 neighbour cache, wherein the first request update message comprises an update ARP/IPv6 neighbour cache message, an L3 address, and an L2 address map; updating, by the UPF entity, the ARP/IPv6 neighbour cache with the L2 address map; and sending, by the UPF entity, a first response update message after updating the ARP/IPv6 neighbour cache to the SMF entity.

In one implementation of the fourth aspect, the present disclosure provides an L3 address management function for Ethernet PDU sessions and for the clients behind the UE/DN in the LAN, where the L3 address management function is located at the SNIT entity. The L3 address management function may be a DHCP server or an IPv6 address assignment function.

In accordance with the fifth aspect of the present disclosure, there is provided a method for performing layer-3 (L3) address management function in a session management function (SMF) entity to update an ARP/IPv6 neighbour cache in a user plane function (UPF) entity, wherein a data network (DN) is a core Ethernet switch. The method comprises: receiving, by the core Ethernet switch, from the end user device, a first request message comprising a first request message over layer-2 (L2), said message comprising source media access control of the end user device; forwarding, by the core Ethernet switch, the first request message to the SMF entity; sending, by the SMF entity, a first response message to the core Ethernet switch for providing L3 address allocation, wherein the first response message comprises the L3 address allocation forwarded by the SMF; forwarding, by the core Ethernet switch, the first response message to the end user device; acquiring, by the SMF entity, the L2 addresses for the end user device at UPF entity as indicated in the first aspect of the present disclosure; sending, by the SMF entity, a first request update message to the UPF to update the ARP/IPv6 neighbour cache, wherein the first request update message comprises an update ARP/IPv6 neighbour cache message, an L3 address, and an L2 address map; updating, by the UPF entity, the ARP/IPv6 neighbour cache with the L2 address map; and sending, by the UPF entity, a first response update message after updating the ARP/IPv6 neighbour cache to the SMF entity.

In one implementation of the fifth aspect, the present disclosure provides a method for updating the ARP/IPv6 neighbour cache at the UPF entity when an L3 address is assigned by the DN.

In accordance with the sixth aspect of the present disclosure, there is provided a method for updating an ARP/IPv6 neighbour cache in a user plane function (UPF) entity when a layer-3 (L3) address is assigned by a data network (DN), wherein said UPF entity is a core Ethernet switch. The method comprises: requesting, by a session management function (SMF) entity, notification of any source layer-2 (L2) address detected by the UPF entity, wherein the L2 address is detected by the UPF entity on a tunnel for a UE at the UPF entity or on a tunnel for clients in the DN; detecting, by the UPF entity, an L2 packet with a new source L2 address on said tunnel; sending, by the UPF entity, the new source L2 address detected on said tunnel to the SMF entity; sending, by the DN, a first update message comprising an L2 address and an L3 address map to the SMF entity; forwarding, by the SMF entity, the first update message comprising an L2 address and an L3 address map to the UPF entity to update the ARP/IPv6 neighbour cache; and sending, by the UPF entity, a first response update message after updating the ARP/IPv6 neighbour cache to the SMF entity.

In one implementation of the sixth aspect, the present disclosure provides a method for updating the ARP/IPv6 neighbour cache at the UPF entity when an L3 address is assigned by the DN.

In accordance with the seventh aspect of the present disclosure, there is provided a method for performing gratuitous address resolution protocol (GARP)/ICMPv6 neighbour advertisement to update the Ethernet switch ARP/IPv6 neighbour cache. The method comprises: initiating, by an application layer, a device trigger message request to initiate GARP/ICMPv6 neighbour advertisement for a 3GPP user equipment (UE) through a network element function (NEF) entity, wherein the device trigger request message comprises an external identifier (ID) to denote a user equipment (UE); forwarding, by the NEF entity, the device trigger request message to an access management function (AMF) entity if the external ID belongs to a valid UE; forwarding, by the AMF entity, the device trigger request message to an end user device; sending, by the end user device, a device trigger response message to the AMF entity; forwarding, by the AMF entity, the device trigger response message to the NEF entity; forwarding, by the NEF entity, the device trigger response message to the application layer; and initiating, by the user equipment upon receiving the device trigger message, a GARP/ICMPv6 neighbour advertisement message.

In one implementation of the seventh aspect, the present disclosure provides a method for performing gratuitous address resolution protocol (GARP)/ICMPv6 neighbour Advertisement to update the Ethernet switch ARP/IPv6 Neighbour cache. The UE/client behind UE/clients in DN, after learning the layer 3 address, does a gratuitous ARP/ICMPv6 neighbour Advertisement to update the Ethernet switch (which can be UPF entity or the DN behind UPF entity) ARP/IPv6 neighbour cache. Through this the switch learns the ARP/IPv6 Neighbour cache, where the UE can be triggered by the device trigger message mentioned above to initiate the GARP/IPv6 neighbour advertisement for itself or for the clients behind it, while the clients in the DN are triggered by some application means outside the scope of 3GPP.

In accordance with the eighth aspect of the present disclosure, there is provided a network element for acquiring layer-2 (L2) addresses seen in a tunnel for an end user device. The network element comprises: a processor unit configured to detect an L2 packet with a new source L2 address on said tunnel; a transceiver module configured to receive a request for notifying any source L2 address detected on said tunnel, and further configured to send the new source L2 address detected on said tunnel; and a memory unit operatively coupled to the processor unit and transceiver module. The tunnel between the network element and a network terminating the end user device is set up by a user plane setup message initiated by a session management function (SMF) entity towards the network element and associated with Ethernet type protocol data unit (PDU) sessions. Further, the tunnel setup at the network element is towards an access network (AN) or a data network (DN).

In accordance with the ninth aspect of the present disclosure, there is provided a network function entity for updating an ARP/IPv6 neighbour cache in a network apparatus by an L3 address management function. The network function entity comprises: a processing unit configured to determine a local configuration that indicates which session management function (SMF) is controlling the network apparatus; a transceiver module configured to receive a first update message, wherein said first update message comprises an L2 address and an L3 address map. The transceiver module is further configured to send the first update message to at least one SMF.

In contrast to the available technology in other approaches, the subject disclosure avoids a paging storm during ARP broadcast/NDP multicast in 5G networks that unnecessarily occupy and hog the network resources. The subject disclosure suggests building an ARP/IPv6 neighbour cache at the UPF entity without performing deep packet inspection for every packet traversed.

The various options and preferred embodiments referred to above in relation to the first implementation are also applicable in relation to the other implementations.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

Figure 1:
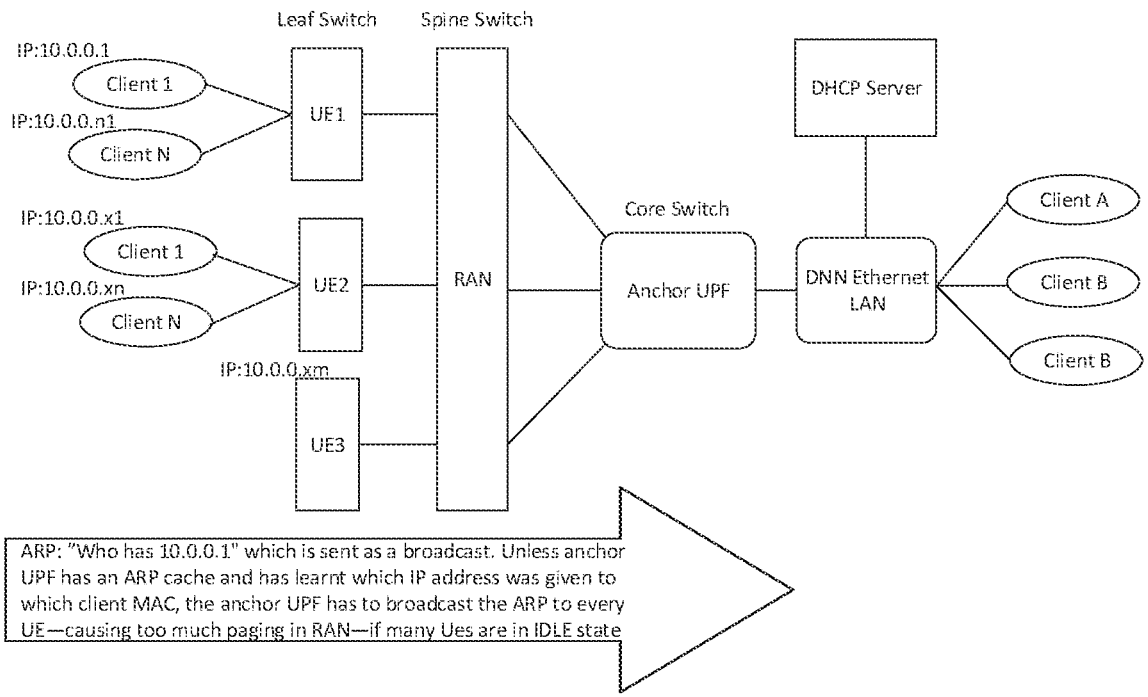
FIG. 1 illustrates a network deployment scenario where a UPF entity acts as the Ethernet switch and broadcasts the ARP/multicasts the ICMPv6 Neighbour Solicitation to every UE in the LAN, in accordance with one embodiment of a problem of the present subject matter.

It is to be understood that the attached drawings are for purposes of illustrating the concepts of the disclosure and may not be to scale.

DETAILED DESCRIPTION OF THE DISCLOSURE

The disclosure can be implemented in numerous ways, as a process, an apparatus, a system, a composition of matter, a computer readable medium such as a computer readable storage medium or a computer network wherein program instructions are sent over optical or electronic communication links. In this specification, these implementations, or any other form that the disclosure may take, may be referred to as techniques. In general, the order of the steps of disclosed processes may be altered within the scope of the disclosure.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications, and equivalents. Numerous details are set forth in the following description in order to provide a thorough understanding of the disclosure. These details are provided for the purpose of example and the disclosure may be practiced according to the claims without some or all of these details. For the purpose of clarity, technical material that is known in the technical fields related to the disclosure has not been described in detail such that the disclosure is not unnecessarily obscured.

In the following detailed description, numerous details are set forth in order to provide a thorough understanding of the disclosure. However, it will be understood by those skilled in the art that the present disclosure may be practiced without these details. In other instances, well-known methods, procedures, and components, modules, units and/or circuits have not been described in detail to not obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

The subject disclosure lies in building an ARP/IPv6 neighbour cache at a UPF entity without performing deep packet inspection for every packet traversed such that the ARP/IPv6 neighbour cache can be used to avoid paging storm during ARP broadcast/ICMPv6 neighbour solicitation multicast for Ethernet type PDU in 5G networks.

In the present disclosure, methods for building ARP/IPv6 neighbour cache at a UPF entity are disclosed.

While aspects are described for methods for building an ARP/IPv6 neighbour cache at a user plane function (UPF) entity without performing deep packet inspection for every packet that traverses the network has been disclosed, the present disclosure may be implemented in any number of different computing systems, environments, and/or configurations, the embodiments are described in the context of the following exemplary systems, devices/nodes/apparatus, and methods.

Henceforth, embodiments of the present disclosure are explained with the help of exemplary diagrams and one or more examples. However, such exemplary diagrams and examples are provided for the illustration purpose for better understanding of the present disclosure and should not be construed as limitation on scope of the present disclosure.

In Ethernets, Ethernet addresses or MAC addresses are required for communication between network devices. Such devices send or receive packets to Ethernet addresses that consists of 48 bits or 6 octets, while IPv4 addresses consists of 32 bits or 4 octets and WO addresses consist of 128 bits or 16 octets. ARP deals with the two kinds of packets: ARP request and ARP reply. When a sender wants to know the MAC address of the destination IP node, it broadcasts the ARP request to every host in the network. The destination node sends a reply to the sender with MAC address through ARP reply in a unicast mode. Similarly, for IPv6 case neighbour discovery deals with two kinds of packets. An ICMPv6 neighbour solicitation, which is sent as a multicast to all the devices attached to the link layer multicast network, and a ICMPv6 neighbour advertisement, which is sent as a unicast reply to the device that initiated the ICMPv6 neighbour solicitation.

Association between the UE and a data network that provides a PDU connectivity service. The type of association can be IP, Ethernet, or unstructured. 3GPP is discussing the introduction of Ethernet PDU type in the 5G architecture such that the UE can request an Ethernet PDU type to the 5G core network.

For a PDU session set up with the Ethernet PDU session type, the session management function (SMF) entity and the UPF entity acting as PDU session anchor can support specific behaviours related with the fact the PDU session carries Ethernet frames. Neither a MAC nor an IP address is allocated by the 5G core network (5GC) to the UE for this PDU session.

The SMF entity is a network element, or a logic module in a network element that performs session establishment, modification and release, including tunnel maintenance between a UPF entity and an AN node, UE IP address allocation and management selection and control of UP function, support for interaction with external DN for transport of signalling for PDU session authorization/authentication by external DN and the like. The SMF entity performs IP address management procedure based on the selected PDU type. If IPv4 PDU type is selected, an IPv4 address is allocated to the UE. Similarly, if IPv6 PDU type is selected, an IPv6 prefix is allocated.

The UPF entity is a network element, or a logic module in a network element that handles the user plane path of PDU sessions. A UPF entity that provides the interface to a data network supports the functionality of a PDU session anchor. Traffic detection and routing information sent by the SMF entity to the UPF entity for a PDU session is associated with Network instance for detection and routing of traffic. A UPF entity can be controlled by a single SMF or by multiple SMFs, for different PDU sessions. The UPF entities traffic detection capabilities are used by an SMF entity to control traffic reporting, quality of service (QoS) enforcement, and traffic routing.

Introducing Ethernet PDU type in the 5G architecture allows a UE to request an Ethernet PDU type to the 5G core network, and the 5G core network allocates a user plane function that acts as the PDU anchor. This anchor UPF entity will act as the core Ethernet switch for all the UEs that are connected to the same LAN through the Ethernet PDU. The UE can also act as an Ethernet bridge allowing clients behind the UE to connect through the 3GPP network, with the UE acting as a local switch.

As per current agreement as captured in the latest draft of 3GPP Technical Specification (TS) 23.501 clause 5.6.10.2, for the Ethernet PDU, the SMF entity is not involved in any address allocation. How the UE obtains its MAC address and upper layer address (IP) is out of scope of 3GPP, as how the UE and/or the clients behind the UE (for bridge mode operation) obtain their layer 3 (IP) address is also out of scope of 3GPP.

The principle behind the present disclosure is for the ARP broadcast/ICMPv6 neighbour solicitation multicast from any Ethernet client (e.g., a LTE or clients behind the UE, or clients in DN) to be responded by a UPF entity itself, by looking up the ARP/IPv6 neighbour cache built in the UPF entity, irrespective of whether the UPF entity acts as the core Ethernet switch or the core Ethernet switch is in the DN. The solution is simplified to always intercept ARP/ICMPv6 neighbour solicitation at the UPF entity and respond to it based on a local ARP/IPv6 neighbour cache.

Notably, responding to ARP/ICMPv6 neighbour solicitation from a local ARP/IPv6 neighbour cache in a switch instead of broadcasting/multicasting to every node in the LAN is a well-known mechanism as indicated hereinabove. Therefore, the present disclosure focuses on how to build an ARP/IPv6 neighbour cache in the UPF entity itself.

Figure 2:
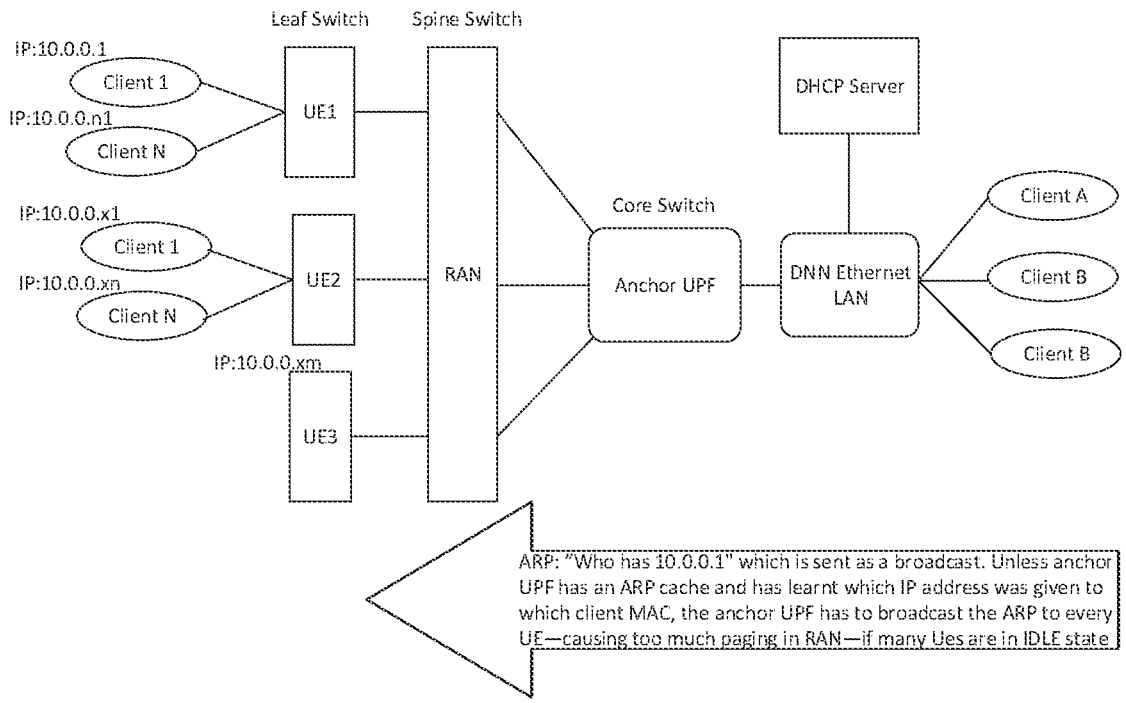
FIG. 2 illustrates a network deployment scenario where a DNN acts as the Ethernet switch and broadcasts the ARP/multicasts the ICMPv6 Neighbour Solicitation to every UE in the LAN, in accordance with another embodiment of a problem of the present subject matter.

The Ethernet clients who are end users such as UEs r clients behind the UE/clients in DN perform an ARP/ICMPv6 neighbour solicitation request to discover the Ethernet MAC address of another UE/clients behind the UE/clients in DN in the same LAN where this ARP/ICMPv6 neighbour solicitation request is tunneled by the RAN to the core network UPF entity, thereafter, two possibilities exist. The first scenario, as illustrated in FIG. 1, is that if a UPF entity acts as the Ethernet switch, it will broadcast the ARP neighbour solicitation to every UE in the LAN. The second scenario, as illustrated in FIG. 2, is that if a DN behind a UPF entity acts as the Ethernet switch, the UPF entity will forward the ARP/ICMPv6 neighbour solicitation to the DN, and the DN will then send back the ARP broadcast on an L2 broadcast address will multicast ICMPv6 Neighbour Solicitation on an L2 multicast address, which will result in the UPF entity sending the ARP/ICMPv6 neighbour solicitation to every UE in the LAN. Significantly, each of these scenarios results in a massive paging storm in the network if many UEs are in CM-IDLE state. A similar problem also exists when clients behind the DNN also become part of the LAN and issue ARP/ICMPv6 neighbour solicitation. Notably, the illustrations in FIGS. 1 and 2 have been provided with respect to an ARP while these issues are also applicable for IPv6 neighbour discovery when ICMPv6 neighbour solicitation is in multicast. Separate illustrations are not provided for IPv6 neighbour discovery and a person skilled in the art would understand the illustrations in the context of both ARP and IPv6 neighbour discovery.

To solve the problem of paging storm that occurs during ARP broadcast/ICMPv6 neighbour solicitation multicast for Ethernet type PDU in 5G networks (which till now has not been discussed or solved in 3GPP), in a first implementation, the present disclosure provides a method of acquiring layer-2 (L2) addresses seen in a tunnel for an end user device at a user plane function (UPF) entity. The method comprises: receiving, by the UPF entity, a request from a session management function (SMF) entity for notifying any source L2 address detected on said tunnel by the UPF entity; detecting, by the UPF entity, an L2 packet with a new source L2 address on said tunnel; and sending, by the UPF entity, the new source L2 address detected on said tunnel to the SW entity. The tunnel between the UPF entity and the network terminating the end user device is set up by a user plane setup message initiated by a session management function (SMF) entity towards the UPF entity and associated with Ethernet type protocol data unit (PDU) sessions. Additionally, the tunnel setup at the UPF entity is towards an access network (AN) or a data network (DN).

In this implementation, the present disclosure provides a method for the SMF entity to learn which tunnel in the UPF entity is destined towards which MAC address(es).

Entities on the LAN connected to the communications system, for example, 5G System (5GS) by the UE may be allocated an IP address by the DN, but this is not defined. Accordingly, it is clear that the SMF entity is not aware of which tunnel (which can be an N3 tunnel or a tunnel towards the DN) in a UPF entity is used for routing traffic towards which MAC address(es). The SMF entity needs to have this knowledge, especially for the case where the L3 address management function for Ethernet PDU sessions is not with the SMF entity (i.e., the DHCP/IPv6 Router is not co-located with the SMF entity).

Figure 3:
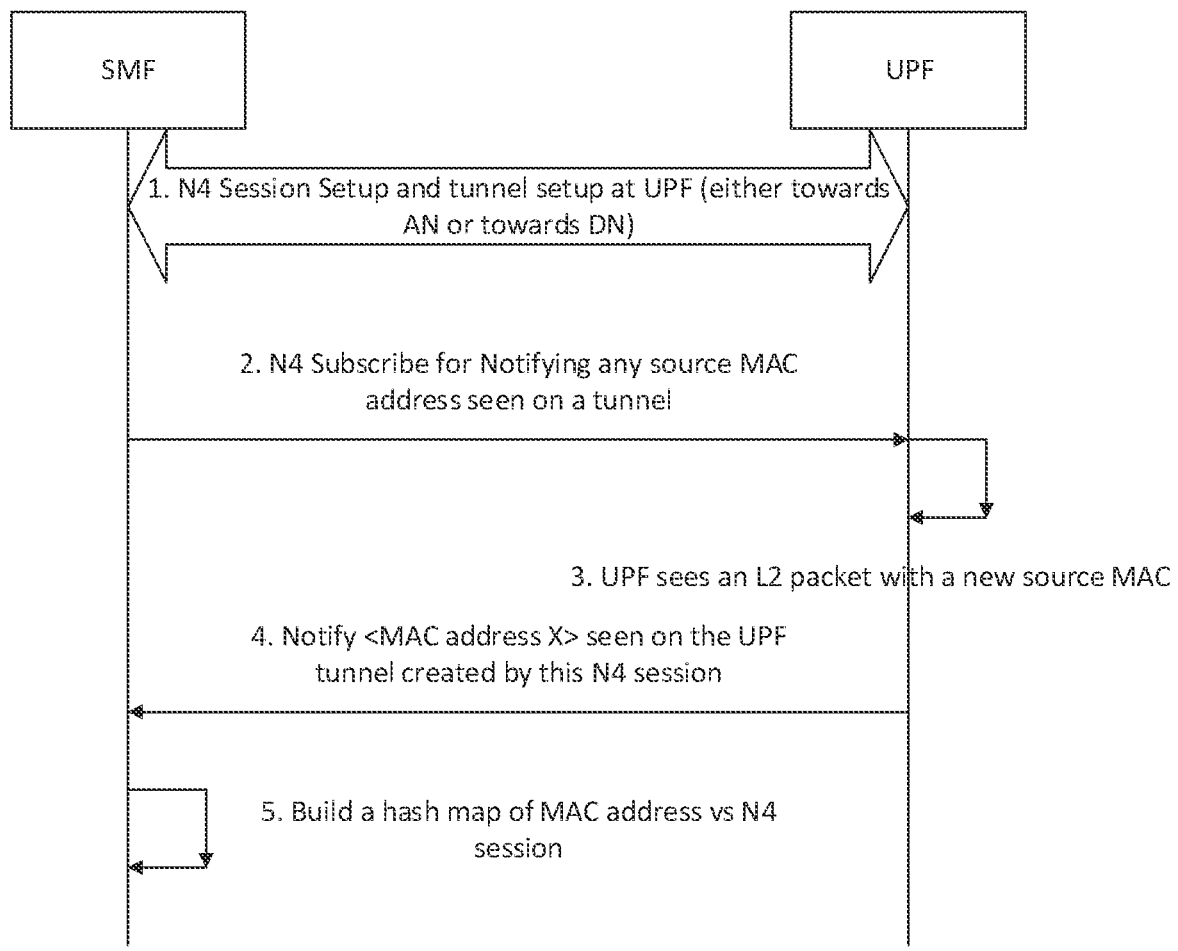
FIG. 3 illustrates a procedure for an SMF entity to build a MAC address to N4 session map, in accordance with an embodiment of the present subject matter.

FIG. 3 illustrates a procedure for an SMF entity to build a MAC address to N4 session mapping, in accordance with a first embodiment of the present subject matter for the end-to-end solution for building the ARP/IPv6 neighbour cache at the UPF entity. After the SW entity sets up the N4 session and has informed the UPF entity about the tunnel to be created (N3 tunnel or a tunnel towards DN), the SMF entity sends an N4 message to subscribe to the UPF entity for notifying the SMF entity whenever a new source MAC address is seen on the tunnel created at the UPF entity. Such subscriptions shall be done fix the N4 sessions associated with Ethernet type PDU sessions.

Notably, the N4 session is akin to a tunnel setup for a PDU session between an access network and a UPF entity or between the UPF entity and a DN, by the SMF entity using the N4 Setup request message. Thus, the "tunnel" is between the UPF entity and the AN, or between the UPF entity and the DN. What is done by the SMF entity is a signalling message (N4 setup request) to set up this tunnel.

In particular, a session is set up between the SMF and the UPF entities for each PDU session or for each tunnel towards the DN. Using these session parameters related to that PDU session are exchanged between the SMF and UPF entities. For example, in order for the SMF entity to learn which MAC address are seen on a PDU session tunnel or a tunnel towards the DN, the information about the MAC address seen has to be carried over this session from the UPF entity to the SMF entity.

Thus, the SMF entity may subscribe for this notification only if the L3 address management function for Ethernet PDU sessions is outside the SMF entity (i.e., in the DN). When the UPF entity sees an L2 packet on the tunnel with a new MAC address, the UPF entity notifies the SMF entity immediately about the new MAC address seen for that N4 session.

An advantage of this method is that as part of updating an ARP/IPv6 neighbour cache in a UPF entity by the DN, if the NEF entity does not have the configuration of which UPF entity is controlled by which SMF entity/entities), it will end up forwarding the <L3 address, MAC address>, tiff address map to all SMF entities. Thus, the SMF entity that got notified of the source MAC from a UPF entity would be the only SMF entity that can update the UPF entity.

A further advantage of this method is that as part of updating an ARP/IPv6 neighbour cache in a UPF entity by the DN, if the core Ethernet switch is in the DN and the UPF entity is not acting as the core Ethernet switch, then the L3 address management function cannot get the UPF entity address through the DHCP/IPv6 stateless address auto-configuration (SLAAC) request is received. Also, if the client sending the L3 address discovery request is in the DN (and not a UE or a client behind the UE), the request will not come through the UPF entity at all. In such a case, the L3 address management function cannot provide any UPF entity address to the SMF entity. Thus, one way the SMF entity can find out which UPF entity to update the ARP/IPv6 neighbour cache is by employing the first implementation of the present disclosure.

In a second implementation, the present disclosure provides a method for updating an ARP/IPv6 neighbour cache in a user plane function (UPF) entity by a session management function (SMF) entity. The method comprises: sending, by the SW entity, a first request message to the UPF entity to update the ARP/IPv6 neighbour cache, wherein the first request message comprises an update ARP/IPv6 neighbour cache message, an L3 address, and an L2 address map; updating, by the UPF entity, the ARP/IPv6 neighbour cache with the L2 address map; and sending, by the UP F entity, a first response update message after updating the ARP/IPv6 neighbour cache to the SMF entity.

In this implementation, the present disclosure provides a method of updating the ARP/IPv6 neighbour cache built in a UPF entity. The SMF entity issues an N4 UPF Configuration Update Request to the UPF entity and carries the update ARP/IPv6 neighbour cache command along with the L3 address to L2 address map. The LYE updates the ARP/IPv6 neighbour cache with the provided map and sends an N4 UPF Configuration Update Response.

Figure 4:
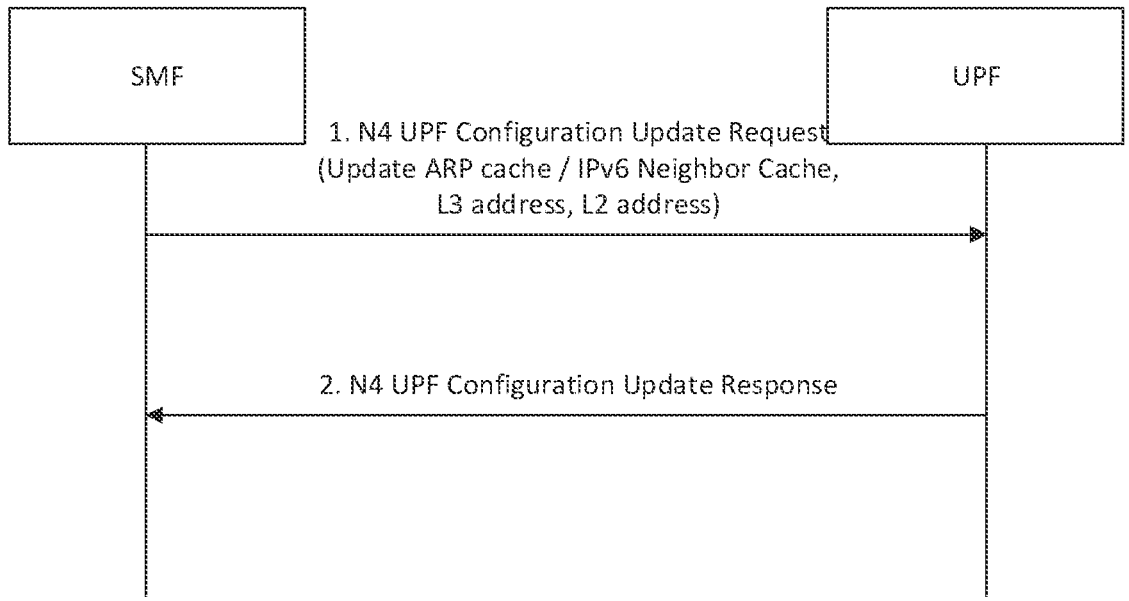
FIG. 4 illustrates an ARP/IPv6 neighbour cache update procedure, in accordance with another embodiment of the present subject matter.

FIG. 4 illustrates how the ARP/IPv6 neighbour cache is updated in a UPF entity by the SMF entity in accordance with second embodiment of the present subject matter. The SMF entity issues an N4 UPF Configuration Update Request to the UPF entity and carries the Update ARP/IPv6 neighbour cache command along with the L3 address to L2 address map. The UPF entity updates the ARP/IPv6 neighbour cache with the provided map and sends an N4 UPF Configuration Update Response.

In a third implementation, the present disclosure provides a method for updating an ARP/IPv6 neighbour cache in a user plane function (UPF) entity by an L3 address management function of a data network (DN). The method comprises: sending, by the DN, a first update message to a network element function (NEF) entity, wherein said first update message comprises an L2 address and an L3 address map; determining, by the NEF entity, a local configuration that indicates which session management function is controlling the LYE entity; and sending, by the NEF entity, the first update message to at least one session management function entity.

In this method, before sending the first update message to a NEF entity, the method performs the steps of: sending, by the UPF entity, a first request message comprising a Dynamic Host Configuration Protocol (DHCP) Request or an Internet Protocol version 6 (IPv6) Router Solicitation to the L3 address management function in the DN; allocating, by the L3 address management function, an L3 address; and sending, by the DN, a first response message comprising L3 address allocation command to the UPF entity. The first update message optionally comprises a second identifier of the UPF entity from which the L3 address discovery request was received. The NEF entity forwards the first update message to all the SMF entities in a network, if no local configuration is available or if the identifier of the UPF entity was not received in the first update message. The L3 address allocation command comprises a DHCP Request or an IPv6 Router Solicitation.

In this implementation, the present disclosure provides a method for updating the ARP/IPv6 neighbour cache built in the UPF entity by the DN. When the L3 address management function is at the DN, this method is employed by the DN to inform the SMF entity about the L2 address to L3 address map such that SMF entity can update the ARP/IPv6 neighbour cache in the UPF entity.

Figure 5:
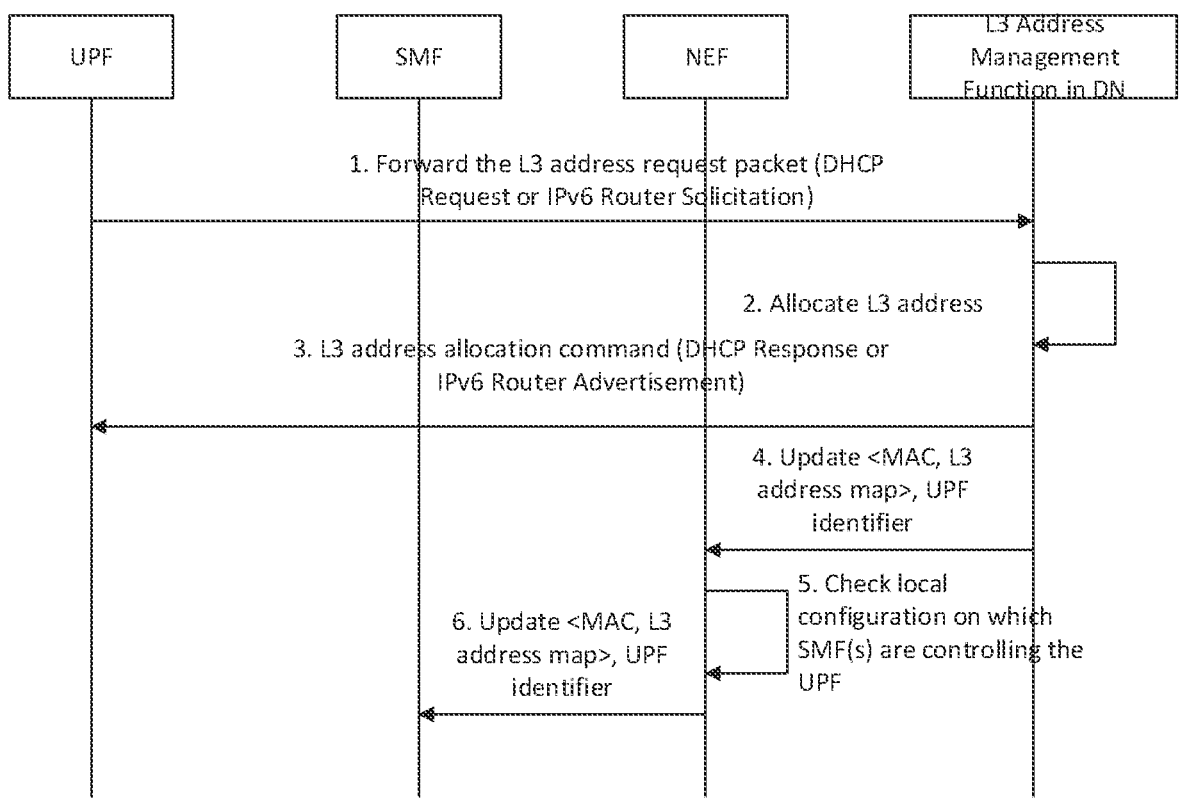
FIG. 5 illustrates a procedure for updating MAC, L3 address map from a DN to a UPF entity via an NEF, SMF entity, in accordance with another embodiment of the present subject matter.

FIG. 5 illustrates updating a MAC, L3 address map from a DN to a UPF entity via an NEF entity, SMF entity, in accordance with a third embodiment of the present subject matter. When updating an ARP/IPv6 neighbour cache in a UPF entity by a DN, if the L3 address management function is at the DN, then a procedure is needed for the DN to inform the SMF entity about the L2 address to L3 address map such that SMF entity can update the ARP/IPv6 neighbour cache in the UPF entity.

Once the L3 address management function in the DN receives an L3 address assignment request from a client, tunneled by a UPF entity, the L3 address management function in the DN acts as an application and updates the NEE entity with the following details.

1. A request to update <MAC address, L3 address mapping> along with the identifier of the UPF entity from which the L3 address discovery request was received, if available. This implies that the UPF entity identifier is optional. It may not be available to the L3 address management function in the DN, in certain cases when the core Ethernet switch is in the DN.

2. If the NEF entity has a local configuration of which SMF entity(ies) are controlling the UPF entity, the NEF entity forwards this update request to only those SMF entity(ies). Otherwise, it sends this update request to all SMF entity(ies).

3. If the UPF entity identifier is received from NET entity to SMF entity, then the SMF entity can directly update the ARP/IPv6 neighbour cache on that UPF entity by employing the second implementation of the present disclosure.

4. If no UPF entity identifier is received from NEF entity to SMF entity, only the SMF entity(ies) that already learned which UPF entity has seen that MAC address before (through the notification defined when SMF entity is learning which tunnel in UPF entity is destined towards which MAC address) will forward the ARP/IPv6 neighbour cache update request to the respective UPF(s) as defined while updating the ARP/IPv6 neighbour cache in UPF entity.

When an L3 address management function is at the SMF entity, the L3 address management function for Ethernet PDU sessions and for the clients behind the UE/DN in the LAN is located at the SMF entity itself. The L3 address management function may be a DHCP server or an IPv6 SLAAC management function. In such a scenario, there are 2 cases to consider.

Case 1: The UPF entity is the core Ethernet switch.
Case 2: The core Ethernet switch is in the DN.

In a fourth implementation, the present disclosure provides a method for performing L3 address management function in a session management function (SMF) entity to update an ARP/IPv6 neighbour cache in a user plane function (UPF) entity, wherein said UPF entity is a core Ethernet switch. The method comprises: receiving, by the UPF entity, a first request message comprising a first request message over layer-2 (L2), said message comprising source media access control of the end user device, from an end user device; forwarding, by the UPF entity, the first request message to the SMF entity; sending, by the SMF entity, a first response message to the UPF entity; forwarding, by the UPF entity, the first response message to the end user device; sending, by the SMF entity, a first request update message to the UPF entity to update the ARP/IPv6 neighbour cache, wherein the first request update message comprises an update ARP/IPv6 neighbour cache message, an L3 address, and an L2 address map; updating, by the UPF entity, the ARP/IPv6 Neighbour cache with the L2 address map; and sending, by the UPF entity, a first response update message after updating the ARP/IPv6 neighbour cache to the SMF entity.

In this method, the first request message is a Dynamic Host Configuration Protocol (DHCP) request and the end user device is a user equipment or a client behind a user equipment.

In this implementation, the present disclosure provides an L3 address management function for Ethernet PDU sessions and for the clients behind the UE/DN in the LAN, where the L3 address management function is located at the SMF entity. The L3 address management function may be a DHCP server or an IPv6 SLAAC management function.

Solution 1 for Case 1

Figure 6:
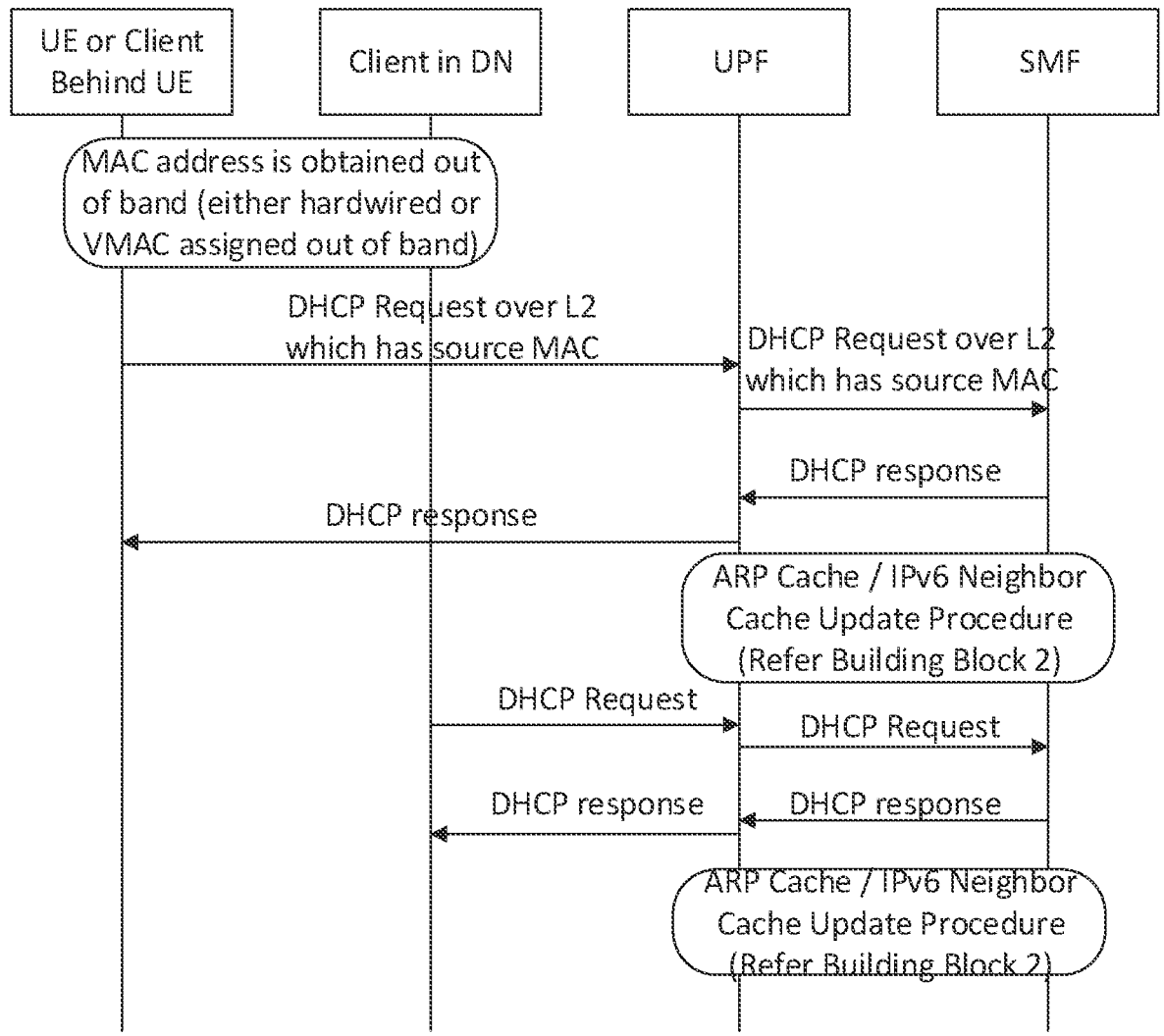
FIG. 6 illustrates an L3 address management function in an SMF entity and an update of an ARP/IPv6 neighbour cache in a UPF entity when the UPF entity is the core Ethernet switch, in accordance with another embodiment of the present subject matter.

FIG. 6 illustrates the call flow sequence for updating the ARP/IPv6 Neighbour cache at the UPF entity when an L3 address is assigned by an SMF entity for case 1. When the SMF entity receives a DHCP request or an IPv6 Router Solicitation, it is received over an L2 Ethernet frame as the UPF entity tunnels the Ethernet PDU it receives as is to the SMF entity. From the L2 frame, the SMF entity identifies the source MAC of the client. After the SMF entity assigns the L3 address to the client by sending a DHCP response/IPv6 Router Advertisement, the SMF entity updates the ARP/IPv6 neighbour cache in the UPF entity by employing the second implementation of the present disclosure.

In a fifth implementation, the present disclosure provides a method for performing a layer-3 (L3) address management function in a session management function (SMF) entity to update an ARP/IPv6 neighbour cache in a user plane function (UPF) entity, wherein a data network (DN) is a core Ethernet switch. The method comprises: receiving, by the core Ethernet switch, from the end user device, a first request message comprising a first request message over layer-2 (L2), said message comprising source media access control of the end user device; forwarding, by the core Ethernet switch, the first request message to the SMF entity; sending, by the SMF entity, a first response message to the core Ethernet switch for providing L3 address allocation, wherein the first response message comprises the L3 address allocation forwarded by the SMF; forwarding, by the core Ethernet switch, the first response message to the end user device; acquiring, by the SMF, the L2 addresses for the end user device at the UPF entity as indicated in the first implementation of the present disclosure; sending, by the SMF entity, a first request update message to the UPF to update the ARP/IPv6 neighbour cache, wherein the first request update message comprises an update ARP/IPv6 neighbour cache message, an L3 address, and an L2 address map; updating, by the UPF entity, the ARP/IPv6 neighbour cache with the L2 address map; and sending, by the UPF entity, a first response update message after updating the ARP/IPv6 neighbour cache to the SMF entity.

In this method, the first request message is a Dynamic Host Configuration Protocol (DHCP) request and the end user device is a user equipment or a client behind a user equipment.

In this implementation, the present disclosure provides a method for updating the ARP/IPv6 neighbour cache at the UPF entity when an L3 address is assigned by the DN.

Solution 1 for Case 2

When the core Ethernet switch is in the DN, the L3 address allocation request would still reach the SMF entity carrying the source MAC address of the client that sent it. Thus, the solution as described above for case 1 will work for this case as well.

Advantages of the two solutions disclosed hereinabove are that they are completely under 3GPP control, thereby enabling the operators to save their network from a paging storm by employing solutions falling within the purview of the 3GPP network's control. Further, these solutions are not computationally intensive and thus, do not unnecessarily hog network resources.

When an L3 address management function is at the DN, there are 2 cases to consider.

Case 1: The UPF entity is the core Ethernet switch.
Case 2: The core Ethernet switch is in the DN.

In a sixth implementation, the present disclosure provides a method for updating an ARP/IPv6 neighbour cache in a user plane function (UPF) entity when a layer-3 (L3) address is assigned by a data network (DN), wherein said UPF entity is a core Ethernet switch. The method comprises: requesting, by a session management function (SMF) entity; for notifying any source layer-2 (L2) address detected by the UPF entity, wherein the L2 address is detected by the UPF entity on a tunnel for a UE at the UPF entity or on a tunnel for clients in the DN; detecting, by the UPF entity, an L2 packet with a new source L2 address on said tunnel; sending, by the UPF entity, the new source L2 address detected on said tunnel to the SMF entity; sending, by the DN, a first update message comprising an L2 address and an L3 address map to the SMF entity; forwarding, by the SMF entity, the first update message comprising the L2 address and the L3 address map to the UPF entity to update the ARP/IPv6 neighbour cache; and sending, by the UPF entity; a first response update message after updating the ARP/IPv6 neighbour cache to the SMF entity.

In this method, after subscribing for notification on any source L2 address detected on the tunnel by the UPF entity, the method performs the steps of: sending, by an end user device, a first request message comprising a DHCP Request or an IPv6 Router Advertisement to the UPF entity; and forwarding, by the UPF entity, the first request message comprising the DHCP Request or the IPv6 Router Solicitation to the DN.

In this method, after notifying the new source L2 addresses detected on the tunnel to the switch, the method performs the steps of sending, by the DN, a first response message comprising a DHCP Response or an IPv6 Router Advertisement to the UPF entity; and forwarding, by the UPF entity, the first response message comprising the DHCP Response or the IPv6 Router Advertisement to the end user device.

The end user device is a user equipment or a client behind a user equipment. The tunnel is an N4 setup and tunnel setup at a UPF entity and associated with Ethernet type protocol data unit (PDU) sessions.

In this implementation, the present disclosure provides a method for updating the ARP/IPv6 neighbour cache at the UPF entity when an L3 address is assigned by the DN.

Solution 2 for Case 1

Figure 7:
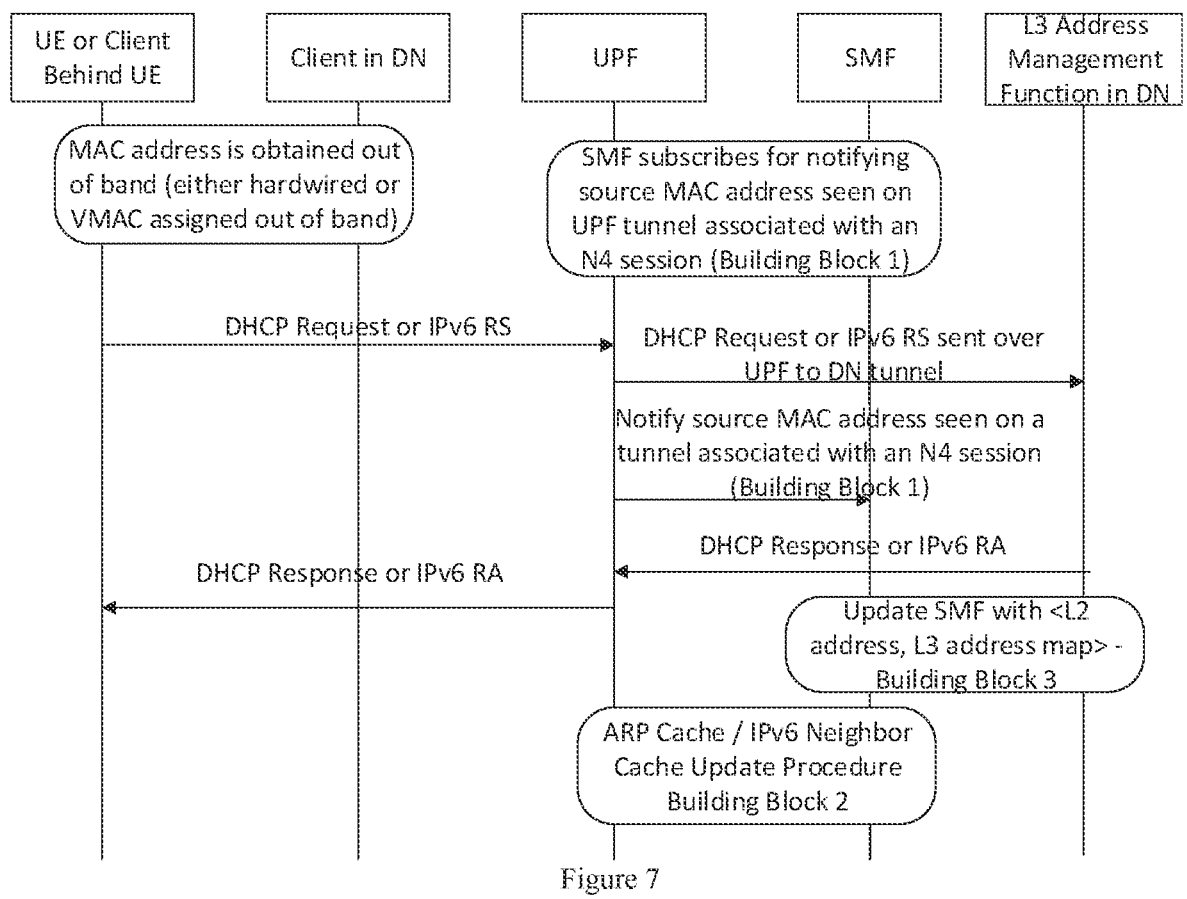
FIG. 7 illustrates an L3 address management function in a DN and an update of ARP/IPv6 neighbour cache in a UPF entity when a core Ethernet switch is in the DN, in accordance with another embodiment of the present subject matter.

FIG. 7 illustrates the call flow sequence for updating the ARP/IPv6 neighbour cache at the UPF entity when an L3 address is assigned by the DN for case 1. Here, for each N4 session, the SMF entity subscribes to the UPF entity to notify it whenever the UPF entity sees a new MAC on the UPF entity tunnel associated with the N4 session. When the UPF entity sees the first L2 packet with a particular source MAC address on a given tunnel (which could be carrying the DHCP Request/IPv6 RS), the UPF entity notifies the SMF entity by employing the first implementation of the present disclosure.

When the L3 address management function in the DN receives a DHCP request or an IPv6 Router Solicitation, it is received over an L2 Ethernet frame as the UPF entity tunnels the Ethernet PDU it receives as is to the DN. From the L2 frame, the DN identifies the source MAC of the client. After the DN assigns the L3 address to the client by sending a DHCP response/IPv6 Router Advertisement, the DN first updates the SMF entity about the <L2 address, L3 address> map by employing the third implementation of the present disclosure. The SMF entity, upon receiving it, updates the ARP/IPv6 neighbour cache in the UPF entity using the second implementation of the present disclosure.

Solution 2 for Case 2

For case 2 where the core Ethernet switch is in the DN, the L3 address allocation request would still reach the L3 address management function in the DN carrying the source MAC address of the client that sent it. Thus, the solution as described above for case 1 will work for this case as well.

Advantages of the two solutions disclosed hereinabove are that they are completely under 3GPP control, thereby enabling the operators to save their network from paging storm by employing solutions falling within the purview of the 3GPP network's control. Further, these solutions are not computationally intensive and thus, do not unnecessarily hog network resources.

Notably, the two solutions disclosed in the present disclosure do not impact a UE, or impact any other 3GPP network functions. Moreover, the UPF entity/core switch in DN need not know the connection management (CM) state of a UE. Further, irrespective of which client sends an ARP, the response to the ARP can be sent from the ARP/IPv6 neighbour cache itself.

It is also possible to perform Deep Packet Inspection (DPI) at a UPF entity. Here, irrespective of where the L3 address management service runs (SMF entity or DN), the MAC address to L3 address mapping is learned by the user plane entities (UPF or Ethernet Switch in DN) through deep packet inspection. DPI at a switch and learning ARP/IPv6 neighbour cache already exist for wired and wireless LAN Ethernet.

Figure 8:
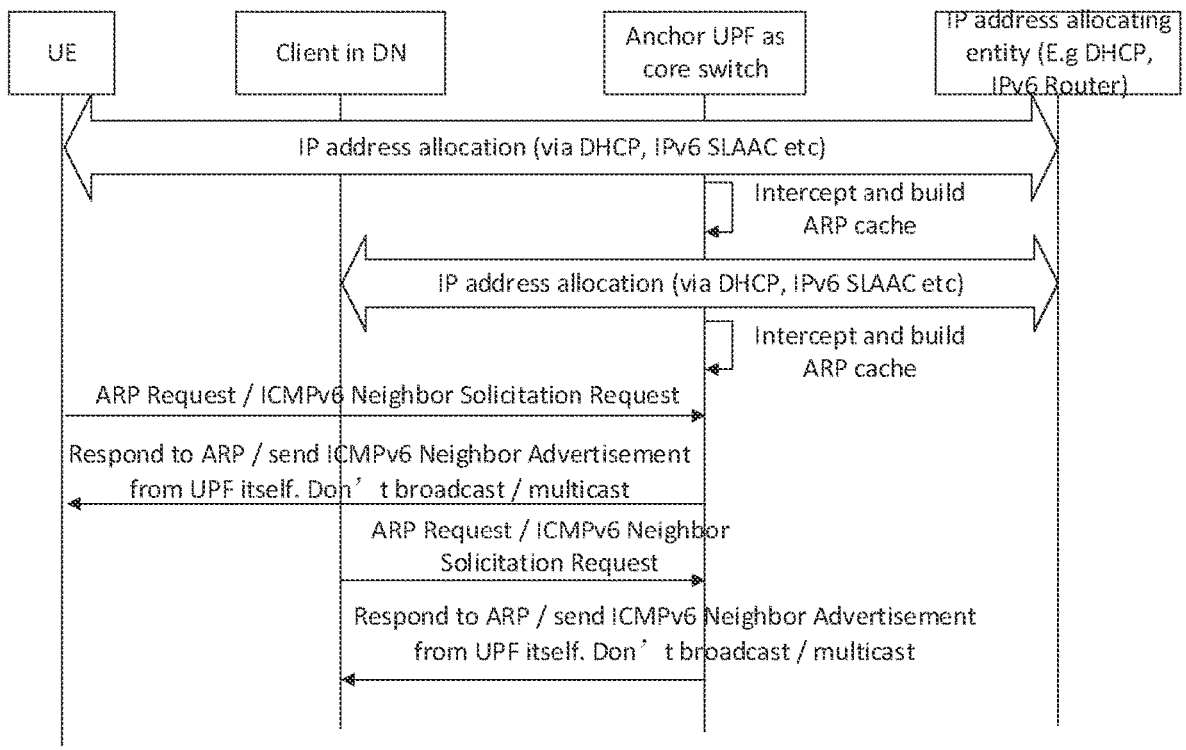
FIG. 8 illustrates deep packet inspection at a UPF entity and building an ARP/IPv6 neighbour cache when the UPF entity is the core Ethernet switch, in accordance with another embodiment of the present subject matter.

FIG. 8 illustrates deep packet inspection at a UPF entity and building an ARP/IPv6 neighbour cache when the UPF entity is the core Ethernet switch. When the anchor UPF entity acts as the core Ethernet switch, the anchor UPF entity intercepts the L3 address discovery packets exchanged between UE/clients behind UE/clients in a DN and the L3 address allocation server (e.g. DHCP server) behind the UPF entity. Through that interception, the UPF entity learns which IP address is allocated to which L2 MAC and builds an ARP/IPv6 neighbour cache. The packet inspection needed here is minimal as it does not require any stateful inspection or complex layer 7 protocol logic. Subsequently when any client sends an ARP request, the UPF entity itself responds to the ARP. The UPF entity responds to any client that sends ARP on behalf of the entity that owns the IP address sent in ARP request.

Figure 9:
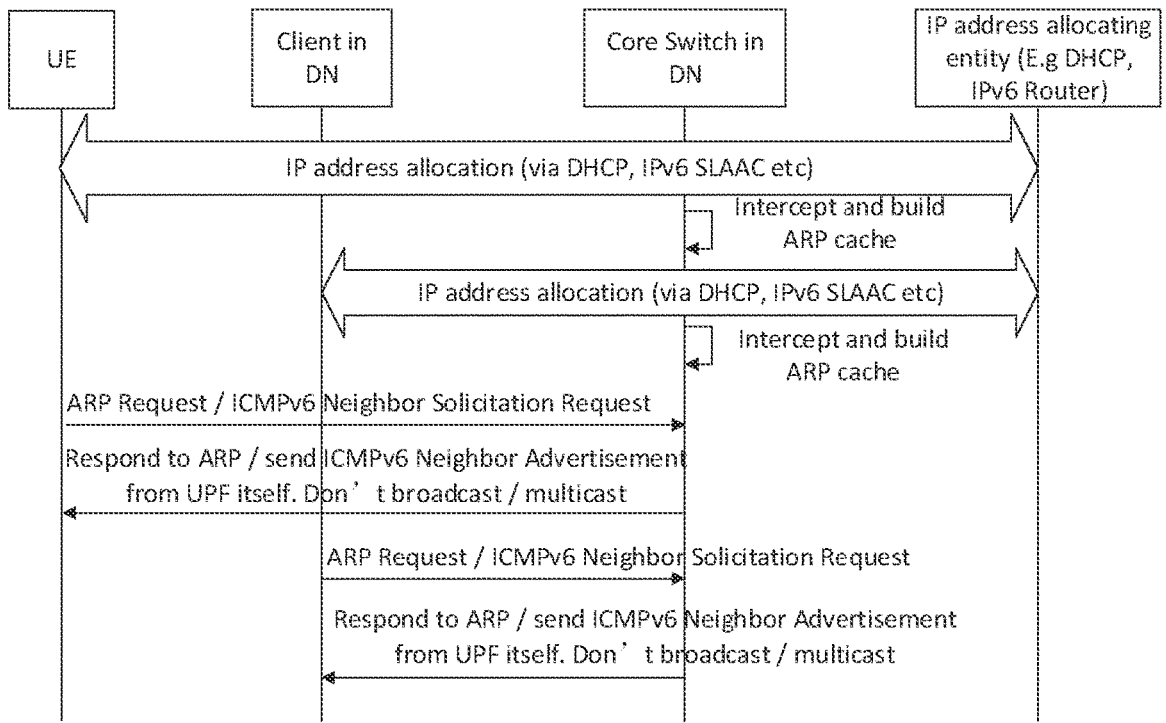
FIG. 9 illustrates a core switch in a DN and a UPF entity acting as a tunneling node to the DN, in accordance with another embodiment of the present subject matter.

FIG. 9 illustrates a core switch in a DN and a UPF entity acting as a tunneling node to the DN. Here, when the anchor UPF entity tunnels Ethernet packets towards a DNN and the DNN has a core Ethernet switch for the LAN, the UPF entity is just acting as a tunneling node to an Ethernet switch in a DN behind the UPF entity. The interception of L3 address discovery packets (e.g., DHCP or IPv6 SLAAC) and building of ARP/IPv6 Neighbour cache can be done in the DN. When the UE sends an ARP request, the UPF entity will tunnel that request to the DN. The DN responds to the ARP request itself by returning the result from the ARP/IPv6 neighbour cache.

When UPF entity is the core Ethernet switch or when the core switch is in the DN, one may think the ARP/IPv6 neighbour cache can be built only for UEs and clients behind UEs. However, the UPF entity acting as a case core switch (for case 1) and the DN acting as a core switch (for case 2) may not know deterministically which MAC address belongs to a UE and clients behind the UE and which MAC address belong to clients in the DN.

An advantage of this solution is that it does not require any signalling to 3GPP network elements like the SMF entity, UPF entity, and NEF entity. However, employing packet snooping and deep packet inspection can be computationally intensive. The UPF/Core Ethernet switch in the DN has to do DPI on each packet to snoop which packet carries DHCP/IPv6 SLAAC address assignment. This wastes central processing unit (CPU) cycles at the switch that impacts the forwarding performance. Further, for the case of a core Ethernet switch being deployed in the DN, the 3GPP network has to depend on a DPI solution being implemented outside the 3GPP network, which is not at all safe/reliable for the 3GPP network operator. Any solution to avoid the paging storm should be inside the network controlled by the 3GPP operator and not depend on solutions implemented by a $3^{rd}$ party network switch. Accordingly, performing DPI at a UPF entity may not be worth considering.

In a seventh implementation, the present disclosure provides a method for performing gratuitous address resolution protocol (GARP)/ICMPv6 Neighbour Advertisement to update the Ethernet switch ARP/IPv6 neighbour cache. The method comprises: initiating, by an application layer, a device trigger message request to initiate GARP/ICMPv6 Neighbour Advertisement for a UE by a network element function (NEF) entity, wherein the device trigger request message comprises an external ID to denote a user equipment (UE); forwarding, by the NEF entity, the device trigger request message to an access management function (AMF) entity if the external ID belongs to a valid UE; forwarding, by the AMF entity, the device trigger request message to an end user device; sending, by the end user device, a device trigger response message to the AMF entity; forwarding, by the AMF entity, the device trigger response message to the NEF entity; and forwarding, by the NEF, the device trigger response message to the application layer.

In this method, if the external ID indicates that the UE is a client behind DN, the device trigger request message is not forwarded to the AMF entity. The end user device is a user equipment or a client behind a user equipment.

In this implementation, the present disclosure provides a method for performing gratuitous address resolution protocol (GARP)/ICMPv6 Neighbour Advertisement to update the Ethernet switch ARP/IPv6 Neighbour cache.

Figure 10:
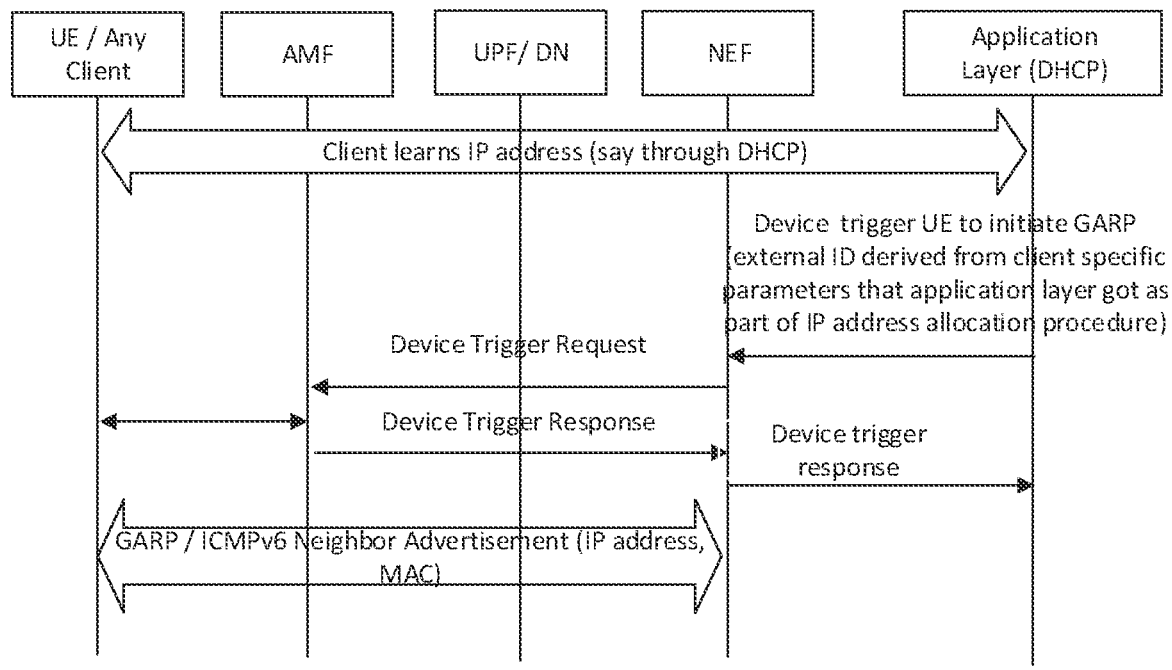
FIG. 10 illustrates a UE that performs gratuitous ARP or ICMPv6 neighbour Advertisement to update the ARP/IPv6 neighbour cache, in accordance with another embodiment of the present subject matter.

FIG. 10 illustrates the call flow when a core switch performs gratuitous ARP/ICMPv6 Neighbour Advertisement to update the ARP/IPv6 Neighbour cache. In this solution, the UE/client behind UE/clients in a DN, after learning the Layer 3 address, does a gratuitous ARP/ICMPv6 Neighbour Advertisement to update the Ethernet switch (which can be a UPF entity or the DN behind UPF entity) ARP/IPv6 neighbour cache, where the UE initiates the GARP/ICMPv6 Neighbour Advertisement for itself or on behalf of clients behind it upon receiving a device trigger, and the clients in the DN initiate the GARP/ICMPv6 Neighbour Advertisement based on application triggers that are outside the scope of 3GPP. Through this the switch learns the ARP/IPv6 neighbour cache. When any client sends an ARP request/ICMPv6 Neighbour Solicitation, the switch itself responds back with the ARP response/ICMPv6 Neighbour Advertisement instead of broadcasting it.

During the IP address allocation procedure, the entity that allocates the IP address (say a DHCP server), based on the client specific parameters, derives an external ID. The external ID is used to initiate a device trigger request towards the NEF. To this end, the application layer (DHCP server or any IP address allocating service) can use the device triggering service defined in TS 23.502.

The NEF, based on authorizing if the external ID belongs to a valid UE or not, will initiate the device trigger request towards the AMF. If the external ID happens to be that of a client behind DN, then it will not have any valid subscription in the 3GPP network and hence no device trigger will be initiated by the NEF in that case.

Figure 11:
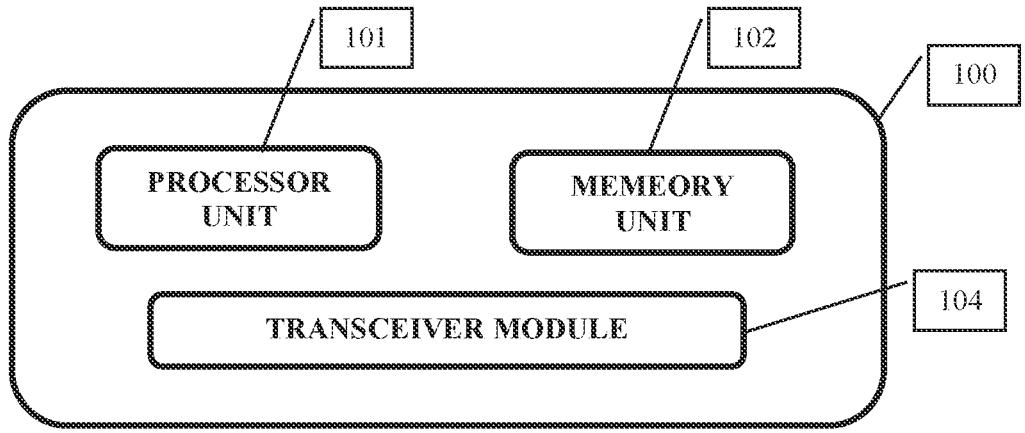
FIG. 11 illustrates a network apparatus in accordance with another embodiment of the present subject matter.

In an eighth implementation, the present disclosure provides a network element 100 for acquiring layer-2 (L2) addresses seen in a tunnel for an end user device. The network element 100, as illustrated in FIG. 11 comprises: a processor unit 101 configured to detect an L2 packet with new source L2 address on said tunnel; a transceiver module 104 configured to receive a request for notifying any source L2 address detected on said tunnel, where said transceiver module 104 is further configured to send the new source L2 address detected on said tunnel; and a memory unit 102 operatively coupled to the processor unit 101 and transceiver module 104. The tunnel between the network element 100 and a network terminating the end user device is setup by a user plane setup message initiated by a session management function (SMF) entity towards the network element 100 and associated with Ethernet type protocol data unit (PDU) sessions. Additionally, the tunnel setup at the network element 100 is towards an access network (AN) or a data network (DN).

The memory unit 102 is further configured to update an ARP/IPv6 neighbour cache with layer-3 (L3) address to L2 address map. The transceiver module 104 is further configured to receive a first request message to update the ARP/IPv6 neighbour cache and to send a first response update message after updating the ARP/IPv6 neighbour cache. The first request message comprises an update ARP/IPv6 neighbour cache message, an L3 address, and an L2 address map.

The transceiver module 104 is further configured to: receive a first request message comprising a first request message over L2, said message comprising source media access control of the end user device; send the first request message to the SMF entity; receive a first response message from the SMF entity; send the first response message to the end user device; receive a first request update message to update the ARP/IPv6 neighbour cache; and send a first response update message after updating the ARP/IPv6 neighbour cache. Notably, the first request update message comprises an update ARP/IPv6 neighbour cache message, an L3 address, and an L2 address map. The memory unit 102 is further configured to update the ARP/IPv6 neighbour cache with the L2 address map. The end user device is a user equipment (UE) or clients behind the UE or clients in DN and the like.

Figure 12:
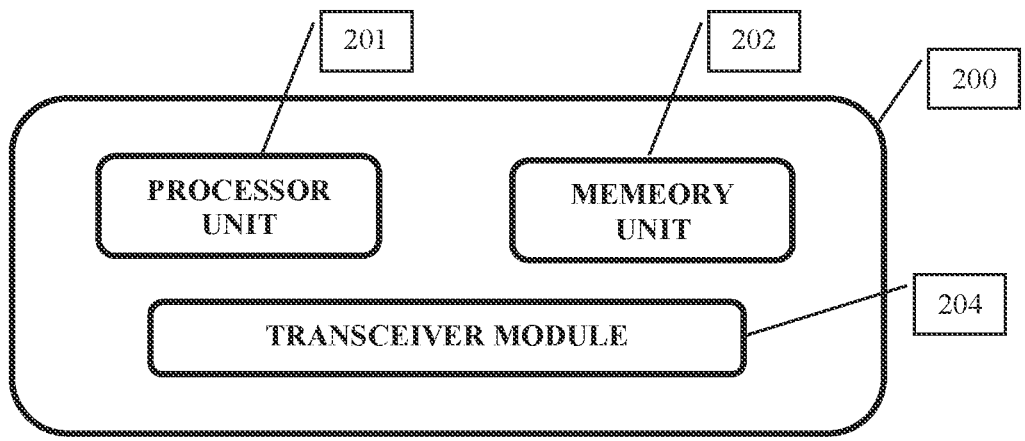
FIG. 12 illustrates a network function entity in accordance with another embodiment of the present subject matter.

In a ninth implementation, the present disclosure provides a network function entity 200 for updating ab ARP/IPv6 neighbour cache in a network apparatus by an L3 address management function. The network function entity 200, as illustrated in FIG. 12, comprises: a processing unit 201 configured to determine a local configuration that indicates which session management function (SMF) is controlling the network apparatus; a transceiver module 203 configured to receive a first update message, wherein said first update message comprises an L2 address and an L3 address map. The transceiver module 203 is further configured to send the first update message to at least one SMF.

The transceiver module 203 is further configured to send the first update message to all the SMF entities in a network, if no local configuration is available or if the network apparatus identifier was not included in the first update message.

The first update message optionally comprises a second identifier of the network apparatus from which the L3 address discovery request was received.

The present disclosure discloses methods for building an ARP/IPv6 neighbour cache at a UPF entity without performing deep packet inspection on every packet that traverses the network for avoiding a paging storm during ARP broadcast for Ethernet type PDU in 5G networks. The principle behind the present disclosure is for the ARP broadcast from any Ethernet client (UE or clients behind UE or clients in DIN) to be responded by a UPF entity itself, by looking up the ARP/IPv6 neighbour cache built in the UPF entity, irrespective of whether the UPF entity acts as the core Ethernet switch or the core Ethernet switch is in the DN. The solution is simplified to always intercept ARP at the UPF entity and respond to it based on a local ARP/IPv6 Neighbour cache.

Notably, the methods of the present disclosure can be used for avoiding ARP broadcast (for IPv4 case) and IPv6 Neighbour Solicitation request multicast (for IPv6 case). The paging issue in ARP broadcast is the same for IPv6 Neighbour Solicitation multicast as well. Thus, there too the response for the Neighbour Solicitation can be returned from the cache built in the UPF entity instead of multicasting it to everyone that is part of the L2 network.

A person skilled in the art may understand that any known or new algorithms may be used for the implementation of the present disclosure. However, it is to be noted that, the present disclosure provides a method that enables implementation of segment routing with traffic engineering to be realized in an existing network without upgrading the product to support higher MSD to achieve the above-mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present disclosure.

In the several embodiments provided in the present disclosure, it should be understood that the disclosed method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present disclosure, or the part contributing to other approaches, or a part of the technical solutions may be implemented in a form of a software product. The computer software product is stored in a storage medium, and includes several instructions for instructing a computer node (which may be a personal computer, a server, or a network node) to perform all or a part of the steps of the methods described in the embodiments of the present disclosure. The foregoing storage medium includes any medium that can store program code, such as a Universal Serial Bus (USB) flash drive, a removable hard disk, a read-only memory (ROM), a random-access memory (RAM), a magnetic disk, or an optical disc.

Devices that are in communication with each other need not be in continuous communication with each other, unless expressly specified otherwise. In addition, devices that are in communication with each other may communicate directly or indirectly through one or more intermediaries.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

Although implementations for a methods and apparatuses that enables implementing an ARP/IPv6 neighbour cache at a UPF entity without performing DPI for every packet to be realized for avoiding paging storm during ARP broadcast/Internet Control Message Protocol version 6 (ICMPv6) Neighbour Solicitation multicast for Ethernet type PDU in 5G networks has been described in language related to features and/or methods, it is to be understood that the appended claims are not necessarily limited to the features or methods described. Rather, the features and methods are disclosed as examples of implementations of building an ARP/IPv6 neighbour cache at a UPF entity.

What is claimed is:

1. A method of acquiring layer-2 (L2) addresses for an end user device, the method comprising:
    sending, by a session management function entity to a user plane function entity, a request for notifying the session management function entity of a source L2 address detected on a tunnel by the user plane function entity;
    receiving, by the user plane function entity, the request from the session management function entity;
    detecting, by the user plane function entity, an L2 packet with a new source L2 address on the tunnel;
    sending, by the user plane function entity, the new source L2 address to the session management function entity;
    receiving, by the session management function entity, the new source L2 address;
    sending, by the session management function entity, a first request update message to the user plane function entity, wherein the first request update message comprises a layer-3 (L3) address and the new source L2 address;
    receiving, by the user plane function entity, the first request update message; and
    updating, by the user plane function entity in response to receiving the first request update message, an Address Resolution Protocol (ARP) neighbour cache with the L3 address and the new source L2 address or an Internet Protocol version 6 (IPv6) neighbour cache with the L3 address and the new source L2 address.

2. The method according to claim 1, wherein the tunnel is between the user plane function entity and a network terminating the end user device, wherein the tunnel is set up by a user plane setup message initiated by the session management function entity towards the user plane function entity, wherein the tunnel is associated with Ethernet type protocol data unit (PDU) sessions, and wherein the tunnel set-up at the user plane function entity is towards an access network (AN).

3. The method according to claim 1, wherein the end user device comprises a user equipment (UE) or clients behind the UE.

4. The method according to claim 1, wherein sending, by the user plane function entity, the new source L2 address comprises sending, by the user plane function entity, a Dynamic Host Configuration Protocol (DHCP) request to the session management function entity, and wherein the DHCP request comprises the new source L2 address.

5. The method according to claim 1, wherein the L3 address is an Internet Protocol (IP) address, and wherein the new source L2 address is a media access control (MAC) address.

6. A method of acquiring layer-2 (L2) addresses for an end user device, the method comprising:
  receiving, by a user plane function entity from a session management function entity, a request for notifying the session management function entity of a source L2 address detected on a tunnel by the user plane function entity;
  detecting, by the user plane function entity, an L2 packet with a new source L2 address on the tunnel;
  sending, by the user plane function entity, the new source L2 address to the session management function entity;
  receiving, by the user plane function entity, a first request update message from the session management function entity, wherein the first request update message comprises a layer-3 (L3) address and the new source L2 address; and
  updating, by the user plane function entity in response to receiving the first request update message, an Address Resolution Protocol (ARP) neighbour cache with the L3 address and the new source L2 address, or an Internet Protocol version 6 (IPv6) neighbour cache with the L3 address and the new source L2 address.

7. The method according to claim 6, wherein the tunnel is between the user plane function entity and a network terminating the end user device, wherein the tunnel is set up by a user plane setup message initiated by the session management function entity towards the user plane function entity, wherein the tunnel is associated with Ethernet type protocol data unit (PDU) sessions, and wherein the tunnel set up at the user plane function entity is towards an access network (AN).

8. The method according to claim 6, wherein the end user device comprises a user equipment (UE) or clients behind the UE.

9. The method according to claim 6, wherein sending, by the user plane function entity, the new source L2 address to the session management function entity, comprises sending, by the user plane function entity, a Dynamic Host Configuration Protocol (DHCP) request to the session management function entity, and wherein the DHCP request comprises the new source L2 address.

10. The method according to claim 6, wherein the L3 address is an Internet Protocol (IP) address, and wherein the new source L2 address is a media access control (MAC) address.

11. A user plane function entity, comprising:
  at least one processor; and
  a non-transitory computer computer-readable storage medium coupled to the at least one processor and configured to store instructions that when executed cause the user plane function entity to:
    receive a request from a session management function entity for notifying the session management function entity of a source layer-2 (L2) address detected on a tunnel by the user plane function entity;
    detect an L2 packet with a new source L2 address on the tunnel;
    send the new source L2 address to the session management function entity;
    receive a first request update message from the session management function entity, wherein the first request update message comprises a layer-3 (L3) address and the new source L2 address;
    update, in response to receiving the first request update message, an Address Resolution Protocol (ARP) neighbour cache with the L3 address and the new source L2 address, or an Internet Protocol version 6 (IPv6) neighbour cache with the L3 address and the new source L2 address.

12. The user plane function entity according to claim 11, wherein the tunnel is between the user plane function entity and a network terminating an end user device, wherein the tunnel is set up by a user plane setup message initiated by the session management function entity towards the user plane function entity, wherein the tunnel is associated with Ethernet type protocol data unit (PDU) sessions, and wherein the tunnel set up at the user plane function entity is towards an access network (AN).

13. The user plane function entity according to claim 12, wherein the end user device comprises a user equipment (UE) or clients behind the UE.

14. The user plane function entity according to claim 11, wherein the at least one processor is configured to execute the instructions to further cause the user plane function entity to send a Dynamic Host Configuration Protocol (DHCP) request to the session management function entity, and wherein the DHCP request comprises the new source L2 address.

15. The user plane function entity according to claim 11, wherein the L3 address is an Internet Protocol (IP) address, and wherein the new source L2 address is a media access control (MAC) address.

16. A system for acquiring layer-2 (L2) addresses for an end user device, wherein the system comprises:
  a session management function entity configured to send a request for notifying the session management function entity of a source L2 address detected on a tunnel; and
  a user plane function entity configured to:
    receive the request from the session management function entity;
    detect an L2 packet with a new source L2 address on the tunnel; and
    send the new source L2 address to the session management function entity,
  wherein the session management function entity is further configured to receive the new source L2 address, and send a first update request message to the user plane function entity, wherein the first update request message comprises a layer-3 (L3) address and the new source L2 address,
    wherein the user plane function entity is further configured to update, in response to receiving the first update request message, an Address Resolution Protocol (ARP) neighbour cache with the L3 address and the new source L2 address, or an Internet Protocol version 6 (IPv6) neighbour cache with the L3 address and the new source L2 address.

17. The system according to claim 16, wherein the tunnel is between the user plane function entity and a network terminating the end user device, wherein the tunnel is set up by a user plane setup message initiated by the session management function entity towards the user plane function entity, wherein the tunnel is associated with Ethernet type protocol data unit (PDU) sessions, and wherein the tunnel set-up at the user plane function entity is towards an access network (AN).

18. The system according to claim 16, wherein the end user device comprises a user equipment (UE) or clients behind the UE.

19. The system according to claim 16, wherein the user plane function entity is further configured to send a Dynamic Host Configuration Protocol (DHCP) request to the session management function entity, and wherein the DHCP request comprises the new source L2 address.

20. The system according to claim 16, wherein the L3 address is an Internet Protocol (IP) address, and wherein the new source L2 address is a media access control (MAC) address.

\* \* \* \* \*

UNITED STATES PATENT AND TRADEMARK OFFICE
CERTIFICATE OF CORRECTION

PATENT NO. : 11,616,753 B2
APPLICATION NO. : 17/390335
DATED : March 28, 2023
INVENTOR(S) : Sridhar Bhaskaran, Marco Spini and Fenqin Zhu It is certified that error appears in the above-identified patent and that said Letters Patent is hereby corrected as shown below:

In the Claims

Claim 11, Column 24, Line 66: "set-up at" should read "set up at"

Signed and Sealed this
Twenty-third Day of May, 2023

Katherine Kelly Vidal
*Director of the United States Patent and Trademark Office*